D. H. Ball.
Shingle Sawing Mach.
N° 97,151.   Patented Nov. 23, 1869.
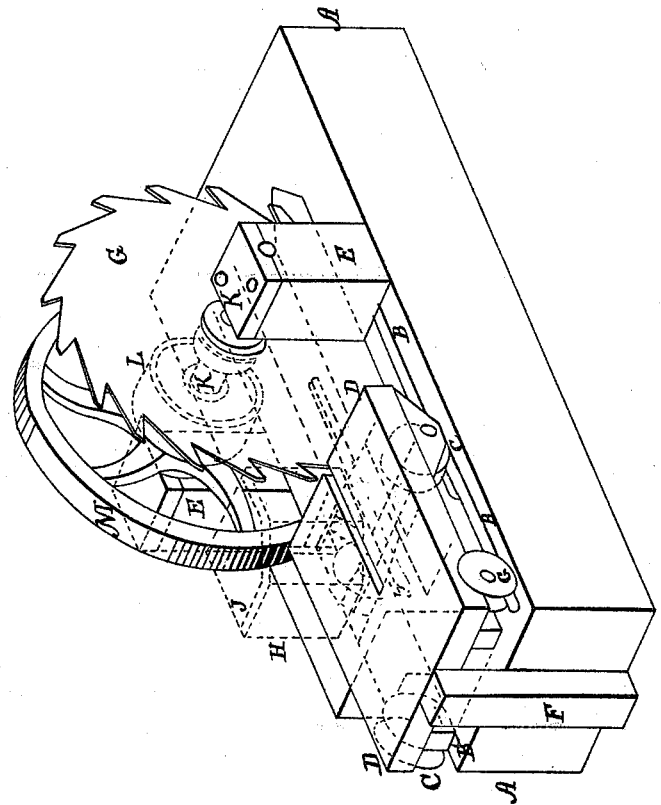
Witnesses.
Jno. D. Patten
Thos. Jewell
Inventor.
D. H. Ball.
By his Atty. J. F. Reigart

UNITED STATES PATENT OFFICE.

D. H. BALL, OF SINNAMAHONING, PENNSYLVANIA.

IMPROVEMENT IN MACHINES FOR SAWING SHINGLE-BOLTS.

Specification forming part of Letters Patent No. 97,151, dated November 23, 1869.

*To all whom it may concern:*

Be it known that I, D. H. BALL, of Sinnamahoning, county of Cameron, and State of Pennsylvania, have invented an Improved Bolting and Sapping Machine for Shingles; and I do hereby declare the following to be an exact description thereof, reference being had to the accompanying drawings, and to the letters of reference marked thereon, making a part of this specification.

The nature of my invention consists in an upright curved toothed circular saw, operating on a raised shaft elevated above the frame-work on posts on the top of the frame or table, with a railway-carriage on the top of the table, upon which the bolt is stood endwise on the carriage, for the purpose of being carried to the saw, to be first cut into four pieces, and then each quarter is trimmed or sapped. The shaft is driven by a band-wheel and regulated with a fly-wheel, to operate the saw as required.

To enable others skilled in art to make and use my invention, I will proceed to describe its construction and operation, as follows:

A represents the platform or table that supports the devices; B B, the rails upon the top of the table, upon which the carriage-wheels C C travel, with their carriage D, back and forth, the carriage being checked in front by the upright post E, and in the rear by the upright post F. G is the circular saw, with graduated teeth, curving downwards in their cutting operation, so as to cut the bolt H rapidly as it is carried forward to the saw. The bolt is stood up endwise on the carriage, and is held at the top by the hand of the operator, and is thus carried forward to the saw and sawed through its center. Each half is then carried in the same manner, and sawed through its center, and, when thus sawed into four pieces, each quarter, as shown at H, is then carried forward, and its outside sapped, as shown by the blue line J, from the top to the bottom of the bolt H.

The saw G is elevated above the table A, and operates on its shaft K, that rests on the top of the upright posts E E, so that the saw can cut the bolt from the top to the bottom, and thus quarter and sap the bolt as it is presented to the saw without dogging or fastening the bolt to the carriage, saving much time and trouble. The saw-shaft K is operated by a band-wheel, L, and regulated by a fly-wheel, M.

What I claim as my invention, and desire to secure by Letters Patent, is—

The arrangement upon the frame A of the posts E, shaft K, with its fly-wheel, pulley, and saw, in connection with the traveling table D, when constructed as herein shown and described, and for the purpose set forth.

D. H. BALL.

Witnesses:
J. FRANKLIN REIGART,
EDM. F. BROWN.